United States Patent Office 3,305,305
Patented Feb. 21, 1967

3,305,305
PURIFICATION OF PHOSPHATE SOLUTIONS
John A. Peterson, Niagara Falls, N.Y., and Rufus G. Hartig, East Orange, N.J., assignors to Hooker Chemical Corporation, Niagara Falls, N.Y., a corporation of New York
No Drawing. Filed Dec. 26, 1962, Ser. No. 247,348
9 Claims. (Cl. 23—107)

This invention relates to a method for purifying aqueous alkali metal phosphate solutions and more particularly, it relates to the purification of alkali metal phosphate solutions which contain vanadium impurities.

In the processes for the manufacture of alkali metal phosphates, such as sodium phosphate, it is frequently the practice to form an aqueous solution of the alkali metal phosphate, from which the final alkali metal phosphate product is obtained, generally by crystallization. These solutions often contain impurities which are undesirable in the final alkali metal phosphate product. Vanadium is one such impurity which is particularly undesirable, in that it imparts a color to the product, thus preventing obtaining of a substantially pure, white alkali metal phosphate material.

It has heretofore been proposed to remove vanadium impurities from alkali metal phosphate solutions by treating a non-alkaline phosphate solution with a reducing agent having a reduction-oxidation potential below about +0.5 volts. In this manner, the vanadium impurities are reduced to the tri- or tetra-valent state and precipitate from this solution as a vanadium-phosphorus complex.

Although this method is generally effective in effecting precipitation of the vanadium impurities from an alkali metal phosphate solution, a difficulty encountered is that the precipitate of the vanadium-phosphorus complex obtained is often troublesome to remove from the solution. Additionally, by this process is has not always been possible to reduce the vanadium impurities to a sufficiently low level so as to eliminate, completely, color in the final alkali metal phosphate product.

It is therefore, an object of the present invention to provide a process whereby vanadium impurities are rapidly and easily removed from an aqueous solution of an alkali metal phosphate.

A further object of the present invention is to provide a process for removing vanadium impurities from an aqueous alkali metal phosphate solution, whereby the solid alkali metal phosphate product obtained by drying the solution is substantially free of vanadium impurities.

These and other objects will become apparent to those skilled in the art from the description of the invention which follows.

The method of the present invention involves treating an aqueous alkali metal phosphate solution containing vanadium impurities by adjusting the pH of the solution to within the range of about 8.0 to 9.0, adjusting the phoshorus concentration of the solution to within the range of about 7.0 to about 9.5 percent phosphorus by weight of the solution, adding to the solution ferrous ions while maintaining the solution at an elevated temperature above about eighthy degrees centigrade, the amount of ferrous ions added being at least sufficient to react with substantially all of the vanadium in the solution to form an iron-vanadium-phosphorus complex, and effecting formation of a precipitate of this complex. Thereafter, this precipitate may be removed from the solution in convenient manner, for example, by centrifuging or filtration, and an alkali metal phosphate may be recovered.

It is to be understood, that as used in the specification and claims, the term "alkali metal" is intended to refer to sodium, potassium, lithium, rubidium, and cesium. Of these, because of its low cost and ready availability, the referred alkali metal is sodium. Accordingly, hereinafter, primary reference will be made to sodium and its compounds, as being the preferred alkali metal. Additionally, the term "alkaline earth metal" is intended to refer to calcium, barium, strontium, magnesium, and beryllium. Of these, the preferred alkaline earth metal is calcium. Accordingly, hereinafter, primary reference will be made to calcium and its compounds, but such references are also applicable to other alkaline earth metals and their compounds. Such references, being exemplary, are not to be taken as being a limitation of the present invention.

The solution treated in accordance with the method of the present invention may be any aqueous alkali metal phosphate solution which contains vanadium impurities. Such solutions may be obtained from the treatment of crude wet process phosphoric acid, from the so-called "leached zone" ore, or from the treatment of ferrophosphorus. In the first instance, the crude phosphoric acid, prepared in the known manner by the wet process, is neutralized with an alkaline material, such as an alkali metal carbonate or an alkali metal hydroxide, to form an aqueous alkali metal phosphate solution which contains vanadium impurities. In the second instance, the "leached zone" ore, which is an aluminum phosphate mineral, is leached with a solution of caustic soda so as to form an aqueous alkali metal phosphate solution which contains vanadium impurities. In the third instance, ferrophosphorus, which is an iron phosphide composition corresponding roughly to a mixture of $Fe_2P$ and $FeP$, is sintered in an oxidizing atmosphere with an alkaline material, such as sodium carbonate. The sintered product is then leached with water so as to obtain an aqueous alkali metal phosphate solution which contains vanadium impurities. These solutions are merely exemplary of those which may be treated in accordance with the method of the present invention. It is to be understood that other, similar alkali metal phosphate solutions which contain vanadium impurities may also be treated.

More specifically, in the practice of the present invention, an aqueous solution of an alkali metal phosphate, such as sodium phosphate, containing vanadium impurities, generally in the form of sodium vanadate, is treated so as to adjust the pH within the range of about 8.0 to about 9.0, a pH within the range of about 8.2 to about 8.5 being specifically preferred. The means by which this pH adjustment is obtained will, of course, depend upon upon the initial pH of the sodium phosphate solution. Where the solution is on the acid side of pH 8, as for example when the solution has an $Na_2O$ to $P_2O_5$ ratio corresponding to that of sodium tripolyphosphate, it will be necessary to add an alkaline material, such as sodium hydroxide or sodium carbonate to the solution in order to obtain a pH within the desired range. Generally, however, the sodium phosphate solutions being treated are on the alkaline side of pH 8, particularly where the solution has been obtained from "leached zone" ore or from ferrophosphorus. In these cases, the pH adjustment is made by adding a suitable acid, preferably phosphoric acid, to the sodium phosphate solution. Although different phosphoric acids may be used to adjust the pH of the solution to within the desired range, it is preferred that more concentrated phosphoric acid solutions be used. One reason for this preference is that, as will be pointed out in more detail hereinafter, after the pH adjustment, the solution may be evaporated, so that the addition of large amounts of water to the solution is to be avoided. Accordingly, it is generally preferred that a commercial phosphoric acid solution containing between about 75 to about 85 percent phosphoric acid be used to adjust the pH of the sodium phosphate solution.

After the pH of the sodium phosphate solution has been adjusted as described, the phosphorus concentration of the solution is preferably adjusted to within the range of about 7.0 to about 9.5 percent phosphorus by weight of the solution, a phosphorus concentration within the range of about 8.5 to about 9.0 percent by weight being specifically preferred. Although any suitable means of adjusting the phosphorus concentration may be used, the sodium phosphate solution is preferably evaporated until the desired phosphorus concentration is obtained.

If the sodium phosphate solution contains silicon impurities, in addition to vanadium impurities, the silicon impurities may be precipitated for removal from the solution after the adjustment of the pH and phosphorus concentration of the solution has been completed. Where the silicon impurities are to be precipitated from the solution, as for example by using the method of a co-pending application, the precipitated silicon material may either be removed at this point in the process or may be kept present in the solution until such time as the complex of iron-vanadium-phosphorus is removed.

After the adjustment of the pH and phosphorus concentration in the sodium phosphate solution has been completed, ferrous ions are introduced into the solution in an amount at least sufficient to reduce substantially all of the vanadium in the solution to at least the tetravalent state and effect the formation of a complex of iron-vanadium- and phosphorus. The ferrous ions are conveniently introduced by adding to the solution a ferrous salt which is soluble in the sodium phosphate solution. The ferrous salt added, should, of course, not be one which will in some manner have a detrimental effect on the solution. Exemplary of ferrous salts which may be used are ferrous sulfate, ferrous chloride, ferrous phosphate, ferrous nitrate, ferrous acetate, and ferrous ammonium sulfate. Of these, the preferred ferrous salt is ferrous sulfate. The reason for this preference is primarily that ferrous sulfate is low in cost, generally readily available, compatible with the solution phosphate solution and does not readily decompose. The ferrous salt will be added to the solution, preferably as an aqueous solution, in an amount which will provide a sufficient quantity of ferrous ions to reduce substantially all of the vanadium in this solution to at least the tetravalent state and effect formation of an iron-vanadium-phosphorus complex. Where the ferrous salt added is ferrous sulfate, it has been found that excellent results have been obtained by adding the ferrous sulfate in an amount within the range of about 10 to about 15 moles of ferrous sulfate to each mole of vanadium in the solution.

During the addition of the ferrous sulfate to the sodium phosphate solution, the pH and phosphorus concentration of the solution should be maintained within the ranges which have previously been established. Additionally, during the addition of the ferrous sulfate, the sodium phosphate solution should be maintained at an elevated temperature above about eighty degrees centigrade and preferably at the boiling point of the solution. Even after the addition of the ferrous sulfate, in order to insure that a substantially complete precipitation of the vanadium from the solution has been effected, the solution may be held at this elevated temperature until no additional precipitation of the vanadium complex takes place. The time for this will generally be about thirty minutes to one hour.

Thereafter, it is preferred that the resulting slurry of the vanadium precipitate in the sodium phosphate solution be aged for an additional period of time at an elevated temperature. By this aging, substantially complete coagulation of the precipitate is obtained. During this aging time of about one to two hours, the slurry should be held at a temperature above about eighty degrees centigrade, but preferably, below the boiling point of the slurry. Additionally, the pH of the slurry should still be maintained within the range of about 8.0 to about 9.0 and the phosphorus concentration of the slurry should be maintained within the range of about 7.0 to about 9.5. It has been found that where these conditions of pH and phosphorus concentration are not maintained during the purification process, filtration of the slurry to remove the vanadium complex precipitate becomes more difficult and, additionally, the filtrate contains higher quantities of either iron and/or vanadium.

With regard to the effect of the pH and phosphorus concentration on filterability, so as to remove the vanadium precipitate, it has been found that when the pH is substantially below about 8.0, the slurry is slow filtering. This has been found to be true even with slurries which were formed at a pH below 8.0 and then adjusted to a pH in excess of 8.0. The slow filtering characteristics of such slurries were still retained. Similarly, with regard to the phosphorus concentration, when the phosphorus concentration is greater than about 9.5 percent by weight, filtration of the slurry has been found to be extremely difficult. Moreover, this difficulty of filtration is retained even though the slurry is rediluted to obtain a phosphorus concentration below about 9.5. Additionally, when phosphorus concentrations below about 7.5 are used, the vanadium content of the resulting sodium phosphate product is undesirably high. Accordingly, it is quite apparent that the maintenance of the pH and phosphorus concentration during the entire process are of significant assistance in obtaining precipitates which are readily filterable from the solution, as well as in obtaining a sodium phosphate product which has a sufficiently low vanadium content.

After the slurry containing the vanadium precipitate has been aged at the elevated temperature for the desired length of time, the precipitate can be removed from the sodium phosphate solution in a convenient manner, e.g., by filtration or centrifuging. Prior to the removal of the vanadium precipitate, however, it may be desirable to lower the iron content of the resulting filtrate. This may be done by adding an alkaline earth metal base, such as an alkaline earth metal hydroxide, to the slurry. Exemplary of alkaline earth metal hydroxides which may be used are calcium hydroxide, and barium hydroxide, with calcium hydroxide being preferred. The calcium hydroxide may be added to the slurry in an amount such as that within the range of about 0.1 to about 0.2 percent by weight of the slurry, while the temperature is maintained not substantially below about eighty degrees centigrade. Preferably, the calcium hydroxide will be added in several portions over a period of several minutes, following which addition the thus-limed slurry may be held at a temperature not substantially below about eighty degrees centigrade for periods up to about thirty minutes. Separation of the solid materials from the slurry can then be effected, as by filtration, and a filtrate is obtained which contains only minor amounts of vanadium and iron as impurities. A typical filtrate thus obtained may contain about 8.7 percent phosphorus, about 24 p.p.m. vanadium and about 63 p.p.m. iron.

The thus-obtained filtrate may then be treated so as to obtain a solid sodium phosphate product. As a part of this treatment, the filtrate may be held at an elevated temperature above about eighty degrees centigrade for a period of up to several hours to allow sufficient time for any "post-precipitation" of iron phosphate salts from the solution. In this manner, a more highly purified phosphate solution can be obtained. This additional holding step is, however, not essential to the process, inasmuch as its primary function is to achieve a greater reduction in iron impurities in the phosphate solution, the removal of which impurities is not as essential as is the removal of the vanadium impurities. Once the "post-precipitation" of any iron phosphate salts has occurred, this precipitate may be removed by filtration. The thus-obtained filtrate is an aqueous solution of sodium phosphate containing only very minor amounts of impurities.

This solution of sodium phosphate may then be subjected to crystallization to obtain a solid sodium phosphate product. Preferably, however, the $Na_2O$ to $P_2O_5$ ratio in the filtrate is adjusted to that of a particular sodium phosphate which is then recovered by dehydration. For example, phosphoric acid can be added to the filtrate to obtain an $Na_2O$ to $P_2O_5$ ratio of 1.67:1 which ratio corresponds to that of sodium tripolyphosphate. Thereafter, the solution is evaporated to dryness and the resulting solid residue is calcined for a period sufficient to bring about molecular dehydration, thus producing solid sodium tripolyphosphate. The thus-obtained sodium tripolyphosphate is white in color and contains no more than about 50 to 60 parts per million (p.p.m.) vanadium and no more than about 150 p.p.m. iron, even though the phosphate may have contained as much as 500–700 p.p.m. vanadium and 300 p.p.m. iron.

In order that those skilled in the art may better understand the method of the present invention and the manner in which it may be practiced, the following specific examples are given. In the examples, the sodium phosphate solution used is prepared in the following manner: All parts in the specification and claims are by weight and all temperatures are in degrees centigrade unless otherwise indicated.

892 parts by weight of a finely-ground ferrophosphorus (200 mesh) containing 23 percent by weight phosphorus was admixed with 1160 parts by weight of soda ash. This amount of soda ash is sufficient to provide a 10 percent excess over the amount theoretically required to react with all of the phosphorus. This mixture was charged into the top of a multiple hearth direct-fired furnace, wherein it was brought to a temperature of about nine hundred and fifty degrees centigrade in the presence of excess oxygen. When the mixture was substantially completely sintered, the sintered product was admixed with sufficient water to leach out all of the $Na_3PO_4$, along with sodium carbonate, sodium vanadate and sodium silicate. The resulting slurry was about forty-three degrees Baumé. This slurry was then passed through a hydrocyclone wherein the dense insoluble material, i.e., unreacted ferrophosphorus, magnetite and other iron oxides, were separated from the slurry. The supernatant slurry, at thirty-five degrees Baumé, was then filtered in a pre-coated vacuum drum filter to remove the very fine insolubles. The resulting filtrate, at twenty-three degrees Baumé, contained 185 parts by weight phosphorus (90 percent of the phosphorus in the ferrophosphorus reaction charge) present as 980 parts by weight of $Na_3PO_4$, 110 parts by weight sodium carbonate, 4 parts by weight $SiO_2$ in the form of sodium silicate, and 0.74 part by weight vanadium in the form of sodium vanadate.

Example 1

To show the effect of pH on the vanadium removal process of the present invention, a series of four runs, (A) through (D), were made. In these runs, a phosphate solution prepared in accordance with the procedure set forth hereinabove, was treated with ferrous ions in the form of ferrous sulfate, to effect removal of vanadium in the solution. The ferrous sulfate was added to the solution while it was maintained at the boiling point and the pH measurement of the solution was made at the time of of the addition of the ferrous sulfate. Once the vanadium precipitate had been formed in the solution, a fifty milliliter portion of the thus-formed slurry was filtered through a two inch diameter Buchner funnel, the bed of which was pre-coated with a diatomaceous earth filter aid. A vacuum, equivalent to 20 inches of mercury, was utilized during the filtration. The time required for the fitlration was noted, this time being that which was required for the disappearance of the liquid phase from the surface of the filter cake on the filter. The procedure was repeated for a total of four times using a 50 milliliter (ml.) portion of the slurry each time. The filter cake on the filter which remained from the previous filtration was not disturbed during the subsequent filtration. In runs C and D, lime was added to the slurry prior to the time of filtration so as to effect a more complete removal of iron from the solution. The filtrate collected from the filtration was then treated with phosphoric acid to adjust the $Na_2O$ to $P_2O_5$ ratio to that of sodium tripolyphosphate, after which the filtrate was evaporated to dryness and the remaining solids were calcined to produce a solid sodium tripolyphosphate, which was then analyzed for vanadium content. Using this procedure the following results were obtained:

TABLE I

| Run | pH | Moles of $FeSO_4$ Added Per Mole of V in Solution | Additive | Percent P in Filtrate | P.p.m. V in STPP | P.p.m. Fe in STPP | Filtration Times | | | |
|---|---|---|---|---|---|---|---|---|---|---|
| | | | | | | | First | Second | Third | Fourth |
| A | 8.20 | 11.9 | None | 8.78 | 27 | Not determined | 23 sec | 25 sec | 30 sec | 38 sec. |
| B | 6.75 | 11.5 | do | 8.95 | 57 | do | 28 sec | 1 min. 35 sec | 2 min. 53 sec | 5 min. |
| C | 8.20 | 11.9 | $Ca(OH)_2$ | 8.73 | 58 | do | 24 sec | 33 sec | 50 sec | 1 min. |
| D | 6.75 | 11.3 | $Ca(OH)_2$ | 8.29 | 30 | do | 22 sec | 1 min. 35 sec | 2 min. 20 sec | 3 min. 25 sec. |

From these results, it is clearly seen that where the pH used is within the desired range, e.g., a pH of 8.2, there is only a relatively small increase in the time required for filtration between the first and the fourth filtrations. In contrast, when the lower pH of about 6.75 is used, there is an appreciably greater increase in the time required for filtration between the first and the fourth filtration. It is further seen that this increase in the filtration time results regardless of whether lime is added to the slurry to aid in iron removal prior to the time of the slurry filtration.

Example 2

To show the effect of the phosphorus concentration on the present vanadium removal process, a series of four runs, A through D, were made. In these runs, the procedure used was the same as that used in Example 1. Using this procedure, the following results were obtained:

TABLE II

| Run | pH | Moles of $FeSO_4$ Added Per Mole of V in Solution | Additive | Percent P in Filtrate | P.p.m. V in STPP | P.p.m. Fe in STPP | Filtration Times | | | |
|---|---|---|---|---|---|---|---|---|---|---|
| | | | | | | | First | Second | Third | Fourth |
| A | 9.0 | 10.0 | $Ca(OH)_2$ | 5.87 | 155 | 15 | 15 sec | 26 sec | 34 sec | 45 sec. |
| B | 8.2 | 10.0 | $Ca(OH)_2$ | 6.33 | 125 | 43 | 16 sec | 21 sec | 36 sec | 46 sec. |
| C | 8.2 | 11.9 | $Ca(OH)_2$ | 8.73 | 58 | 155 | 24 sec | 33 sec | 50 sec | 1 min. |
| D | 8.2 | 11.9 | $Ca(OH)_2$ | 9.00 | 68 | 98 | 32 sec | 1 min. 32 sec | 2 min | 2 min. 40 sec. |

From these results, it is seen that at lower phosphorus concentrations in the filtrate, although the filtration time has not increased greatly between the first and the fourth filtration, the vanadium content of the final sodium tripolyphosphate product is higher. In contrast, in run C, where the preferred phosphorus concentration is used, a lower vanadium content in the final sodium tripolyphosphate product is obtained while still retaining a satisfactory filtration time. It is further seen that when higher phosphorus concentrations are used, e.g., about 9 percent by weight, as in run D, a satisfactory low level of vanadium is still obtained in the sodium tripolyphosphate product.

*Example 3*

To show the effect of the temperature at the time of the ferrous sulfate addition to the solution, a series of four runs, A through D, were made. In these runs, the solution was at a pH of about 6.75 at the time of the addition of the ferrous sulfate. The ferrous sulfate was added, in either a solution or as a solid, in several portions. The vanadium precipitate formed as a result of the ferrous sulfate addition was removed by filtration and the resulting filtrate had a phosphorus concentration in the range of about 10 to about 11 percent. The starting solution, to which the ferrous sulfate was added had a vanadium content in the range of about 500 to 700 p.p.m. vanadium. The filtrate obtained after the vanadium precipitate was removed was treated in accordancce with the procedure of Example 1 to obtain a solid sodium tripolyphosphate product. Using this procedure, the following results were obtained:

TABLE III

| Run | Form of FeSO Added | Moles of FeSO$_4$ Added per Mole of V in Solution | Temp. During Time of Addition | Time for Addition | P.p.m. V in STPP Product |
| --- | --- | --- | --- | --- | --- |
| A | Sol | 12.3 | 80° C | 2.5 hrs | 300 |
| B | Sol | 11.4 | Boil | 2.5 hrs | 110 |
| C | Solid | 12.3 | 80° C | 2.5 hrs | 310 |
| D | ...do | 25.0 | Boil | 2.5 hrs | 104 |

From the above results, it is apparent that when the temperature of the solution during the addition of the ferrous sulfate is at the boiling point, the amount of vanadium present in the sodium tripolyphosphate product obtained is considerably less than when the temperature is below the boiling point as for example, at eighty degrees centigrade. It will be noted, however, that in both cases, the vanadium content of the final sodium tripolyphosphate product is undesirably high, due to the high phosphorus content of the solution, which was outside the range of the present invention.

*Example 4*

A sodium phosphate solution, of twenty-three degrees Baumé and containing 980 parts by weight of $Na_3PO_4$, 110 parts by weight of sodium carbonate, 4 parts by weight $SiO_2$ and sodium silicate and 0.74 part by weight vanadium as sodium vanadate, was prepared from the treatment of ferrophosphorus, using the procedure as set forth herein above. This solution was then evaporated to a phosphorus concentration of about 8.5 percent by weight phosphorus, which is about forty-four degrees Baumé. The forty-four degrees Baumé liquor which was at a pH within the range of 10 to 12 was then treated with phosphoric acid having a concentration of 75 percent by weight until the pH was adjusted to about 8.2. The solution was then held at a temperature within the range of eighty to ninety degrees centigrade for a period of about thirty minutes, during which time precipitation and coagulation of better than 90 percent of the $SiO_2$ present occurred. This precipitate was not removed from the solution at this point in the process. The temperature of the solution was then raised to the boiling point, i.e., in excess of about one hundred degrees centigrade, and 27 pounds of $FeSO_4$ dissolved in water to make a 25 percent by weight solution, was added slowly to the hot solution. The $FeSO_4$ was added over a period of one hour, during which time the solution was stirred vigorously, and a precipitate of iron phosphate and iron vanadium phosphate was formed. The resulting slurry was maintained at a temperature of about eighty degrees centigrade for about one hour and thirty minutes, after the addition of the $FeSO_4$ was completed. After about one hour of this retention time, lime [$Ca(OH)_2$] was added to the slurry in a proportion about 0.1 percent by weight of the slurry. During the addition of the lime, the temperature of the slurry was maintained at eighty degrees centigrade. After the hour and thirty minutes retention time, the slurry was filtered and the resulting filter cake was washed with water in an amount of about 16 parts of water for each 100 parts of the forty-four degrees Baumé solution. The wash waters were not combined with the solution. The forty-four degrees Baumé filtrate was then maintained at a temperature of eighty degrees centigrade for about 2 hours, during which time "post-precipitation" of iron phosphate compounds occurred. These compounds were then removed by passing the liquor through a polishing filter. To the resulting clarified filtrate, phosphoric acid having a concentration of about 75 percent by weight was added until a molar ratio of $Na_2O$ to $P_2O_5$ of 1.67:1 was obtained. The pH of the solution at this point was about 6.7. The resulting solution was then evaporated to dryness and the obtained solids were calcined to produce sodium tripolyphosphate. The sodium tripolyphosphate product was white in color and contained 50 p.p.m. vanadium and 150 p.p.m. of iron.

While there have been described various embodiments of the invention, the methods described are not intended to be understood as limiting the scope of the invention, as it is realized that changes therewithin are possible, and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. A process for purifying an aqueous alkali metal phosphate solution containing vanadium impurities and having a pH which is not in excess of about 8.0, which comprises adjusting the pH of the alkali metal phosphate solution to within the range of about 8.0 to about 9.0, adjusting the phosphorus concentration of the solution to within the range of about 7.0 to about 9.5 percent phosphorus by weight of the solution, maintaining the thus-adjusted solution at an elevated temperature above about eighty degrees centigrade while adding ferrous ions to the solution in an amount at least sufficient to reduce vanadium present to at least the tetravalent state, effecting formation of a precipitate containing such reduced vanadium and separating said precipitate from the solution.

2. The process as claimed in claim 1 wherein the alkali metal phosphate solution is maintained at the boiling point during the addition of the ferrous ions.

3. The process as claimed in claim 2 wherein the alkali metal phosphate solution is a sodium phosphate solution.

4. The process as claimed in claim 3 wherein the pH of the solution is adjusted to within the range of about 8.2 to about 8.5 and the phosphorus concentration of the solution is adjusted to within the range of about 8.5 to about 9.0 percent phosphorus by weight of the solution.

5. The process as claimed in claim 4 wherein the ferrous ions are added to the solution as ferrous sulfate.

6. The process as claimed in claim 5 wherein the amount of ferrous sulfate added to the solution is within the range of about 10 to 15 moles of ferrous sulfate per mole of vanadium in the solution.

7. The process as claimed in claim 6 wherein prior to the removal of the vanadium precipitate from the solution, an alkaline earth metal base is added to the solution in an amount at least sufficient to effect a lowering of the iron content of the solution.

8. The process as claimed in claim 7 wherein the alkaline earth metal base is an alkaline earth metal hydroxide which is added in an amount within the range of about 0.1 to about 0.2 percent by weight of the solution.

9. The process as claimed in claim 8 wherein the alkaline earth metal hydroxide is calcium hydroxide.

References Cited by the Examiner
UNITED STATES PATENTS

| | | | |
|---|---|---|---|
| 279,445 | 6/1883 | Scheibler | 23—182 X |
| 1,812,761 | 9/1931 | Stevens et al. | 23—182 |
| 1,843,006 | 1/1932 | Stevens et al. | 23—182 |
| 1,891,293 | 12/1932 | Conway et al. | 23—106 |
| 2,654,655 | 10/1953 | Banning et al. | 23—107 |
| 2,977,191 | 3/1961 | Pottiez | 23—107 |
| 3,220,795 | 11/1965 | Peterson et al. | 23—107 |

OSCAR R. VERTIZ, *Primary Examiner.*

O. F. CRUTCHFIELD, *Assistant Examiner.*